(12) United States Patent
Nonaka

(10) Patent No.: US 6,257,815 B1
(45) Date of Patent: Jul. 10, 2001

(54) LOCK STRUCTURE USING NUT

(75) Inventor: Hiroki Nonaka, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/498,366

(22) Filed: Feb. 4, 2000

(30) Foreign Application Priority Data

Mar. 5, 1999 (JP) .................................................. 11-058159

(51) Int. Cl.[7] .............................. F16B 39/12; F16B 39/22
(52) U.S. Cl. .......................... 411/223; 411/237; 411/295
(58) Field of Search .................................... 411/223, 237, 411/239, 244, 295

(56) References Cited

U.S. PATENT DOCUMENTS

| | | | | |
|---|---|---|---|---|
| 798,576 | * | 8/1905 | Exley | 411/223 |
| 898,432 | * | 9/1908 | Boyle | 411/237 |
| 4,227,560 | * | 10/1980 | Karlsson | 411/295 |
| 4,436,468 | * | 3/1984 | Ozaki et al. | 411/295 X |
| 4,645,395 | * | 2/1987 | Lundgren | 411/295 X |
| 5,248,232 | * | 9/1993 | Chiang | 411/237 |
| 5,855,463 | * | 1/1999 | Newby | 411/244 |

FOREIGN PATENT DOCUMENTS

| | | |
|---|---|---|
| 2-225816 | 9/1990 | (JP) . |
| 3-229008 | 10/1991 | (JP) . |
| 6-18719 | 3/1994 | (JP) . |

* cited by examiner

*Primary Examiner*—Neill Wilson
(74) *Attorney, Agent, or Firm*—Oblon, Spivak, McClelland, Maier & Neustadt, P.C.

(57) ABSTRACT

A lock structure, in which a nut member is screwed on a threaded portion formed in a shaft member in the axial direction and in which a fixed member fitted on the shaft member is thrust in the axial direction and fixed by the nut member. The lock structure comprises: a lock nut member screwed in the threaded portion on the opposite side of the fixed member across the nut member; a first threaded portion formed in a portion of the nut member other than the portion screwed on the threaded portion and having a lead angle different from that of the threaded portion; and a second threaded portion screwed in the first threaded portion and formed on the lock nut member.

8 Claims, 7 Drawing Sheets

LOCK STRUCTURE USING NUT

BACKGROUND OF THE INVENTION

1. Field of the Invention

The present invention relates to a lock structure for fixing and locking a member to be fixed such as a bearing screwed on a rotary shaft, by thrusting the fixed member in the axial direction.

2. Related Art

When a nut screwed on a bolt or a screw shaft is fastened, a stress in the thrusting direction is generated in the nut so that a frictional force is generated between the screwed face or the nut and the fixed member to stop the turn of the nut. In short, the fixed state by the nut is held. It is, however, known that if a vibration or impact is applied to that nut or screw shaft, the thrusting force is instantly dropped by an elastic deformation so that the nut is accordingly turned to get loose. In order to prevent this looseness of the nut, there has been known in the prior art the double lock nut in which a lock nut different from the fastening nut is used so that the fastening nut and the lock nut are screwed in their thrusting directions thereby to establish a high frictional force on their individual screwed faces.

According to a lock nut structure of the prior art, for example, a fastening nut 101 is fastened so far on a bolt 100 as to come into abutment against a washer 102, as shown in FIG. 7, and a lock nut 103 is then fastened so far as to come into contact with the fastening nut 101. Next, with the fastening nut 101 being slightly returned or being fixed by a wrench, the lock nut 103 is further fastened by the wrench. Thus, stresses in the upper direction (or X-direction) and in the downward direction (or Y-direction) of FIG. 7 are generated in the fastening nut 101 and the lock nut 103 thereby to thrust them into contact. As a result, the screwed face 104 of the upper lock nut 103 is forcibly thrust upward (in the X-direction) of FIG. 7 by the screwed face 105 of the bolt 100, and the screwed face 106 of the fastening nut 101 is forcibly thrust downward (in the Y-direction) of FIG. 7 by the screwed face 105 of the bolt 100. Thus, the facial pressure and the frictional force on the screwed faces rise to prevent the turns or looseness of the fastening nut 101 and the lock nut 103.

In Japanese Utility Model Laid-Open No. 6-18719, on the other hand, there is disclosed a nut locking structure in which the end face of a lock nut contacting with a fastening nut is an inclined face obliquely intersecting the axis of the lock nut.

According to this structure of Japanese Utility Model Laid-Open No. 6-18719, the fastening nut is fastened on a bolt, and the lock nut is fastened. From the instant when the lock nut abuts the fastening nut, the inclined face of the lock nut is turned by the clearance of the meshing portions of the lock nut and the bolt while being inclined in the direction to take facial contact with the end face of the fastening nut. As a result, a bending moment acts on the bolt, and a reaction to the bending moment acts on the bolt to fix the lock nut and the fastening nut.

However, what is mainly intended by the double lock nut structure of the prior art is the function to lock the fastening nut 101 such that the fastening nut 101 is thrust downward (in the Y-direction of FIG. 7) by the lock nut 103. However, the fastening nut 101 thrusts the fixed member or the like downward (in the Y-direction) of FIG. 7 and receives the reaction upward (in the X-direction). If the fastening nut 101 is thrust downward (in the Y-direction) by the lock nut 103, therefore, the reaction from the fixed member is received by the lock nut 103. As a result, the fastening nut 101 is just interposed between the lock nut 103 and the fixed member so that it does not perform the locking action. Thus, there is no locking function between the fastening nut 101 and the lock nut 103 so that the fastening nut 101 or the lock nut 103 is easily loosened when a vibration is applied thereto.

On the other hand, let the case be considered, in which the fastening nut 101 is fastened and then locked by the lock nut 103, as shown in FIG. 7. Then, the screwed face 106, as held in contact by the fastening nut 101, is released by the lock nut 103 to lower the double nut effect. Moreover, the fastening nut 101 is fastened with its end face being unstably inclined.

In the structure of Japanese Utility Model Laid-Open No. 6-18719, on the other hand, the abutting faces of the two nuts are inclined in the radial direction. As the lock nut is fastened, therefore, there increases the bending load on the shaft on which those nuts are screwed. This raises a disadvantage that the deflection of the shaft increases.

In the prior art, moreover, there is known a structure in which set screws 111 of a precision lock nut 110 are inserted radially of the precision lock nut 110 to thrust a threaded shaft 112. In the construction of this kind, however, when the set screws 111 are fastened, the individual axial forces and the individual radial forces of the set screws 111 grow different, as indicated by arrows in FIG. 8, because the inclinations of the threaded faces thrust by the set screws 111 are different for the individual set screws 111. This established a deflection in the threaded shaft 112. When the set shoes 111 shown in FIG. 8 are fastened, more specifically, the directions and magnitudes of the loads along the threaded face are different for the individual set screws 111 so that the differences act as the bending load on the threaded shaft 112 thereby to deflect the threaded shaft 112. As a result, the shaft is so largely deflected that it cannot be employed as a rotary shaft rotating at a high speed.

Thus in the precision lock nut 110 of the prior art, if the set screws 111 are adjusted to stress the correction of the deflection of the threaded shaft 112, the set screws 111 cannot be sufficiently fastened for the locking purpose so that the nut gets loose. This makes it necessary to perform the fastening operation by the set screws 111 in cooperation with the locking action of the nut and the correction of the deflection of the shaft. As a result, there is a problem that it is obliged to perform the difficult fastening works taking a long time.

SUMMARY OF THE INVENTION

An object of the invention is to lock a nut member fixing a member to be fixed, by thrusting it in the axial direction, reliably without causing any deflection in a shaft member screwing the nut member.

Another object of the invention is to make a locking work for fixing a nut member and a work for correcting a deflection of a shaft member, independent of each other.

In the invention, a lock nut member is arranged on the opposite side of a member to be fixed, across a nut member thrusting the fixed member in the axial direction, and is screwed like the nut member on a shaft member. Moreover, the lock nut member and the nut member are connected to each other through their externally threaded portion and internally threaded portion, which have a lead angle different from that of the threaded portion of the shaft member.

As the lock nut member is turned relative to the nut member, therefore, a thrusting force between the three components, i.e., the nut member, the lock nut member and the shaft member increases to lock the nut member firmly, because the lead angle of the threaded portion for the shaft member and the lead angle of the threaded portion for the nut member are different. In this case, no load in the radial direction is especially established so that the deflection of the shaft member can be prevented.

In the invention, on the other hand, the nut member can be provided with set screws which are screwed in the radial direction of the nut member. A stress in the radial direction with respect to the shaft member is generated by screwing the set screws so far as to come into abutment against the shaft member. As a result, the deflection of the shaft member can be corrected by screwing the set screws. In short, it is possible to perform the locking work of the nut member and the correction of the deflection of the shaft member independently of each other.

The above and further objects and novel features of the invention will more fully appear from the following detailed description when the same is read with reference to the accompanying drawings. It is to be expressly understood, however, that the drawings are for purpose of illustration only and are not intended as a definition of the limits of the invention.

DESCRIPTION OF THE PREFERRED EMBODIMENTS

Figure 1:
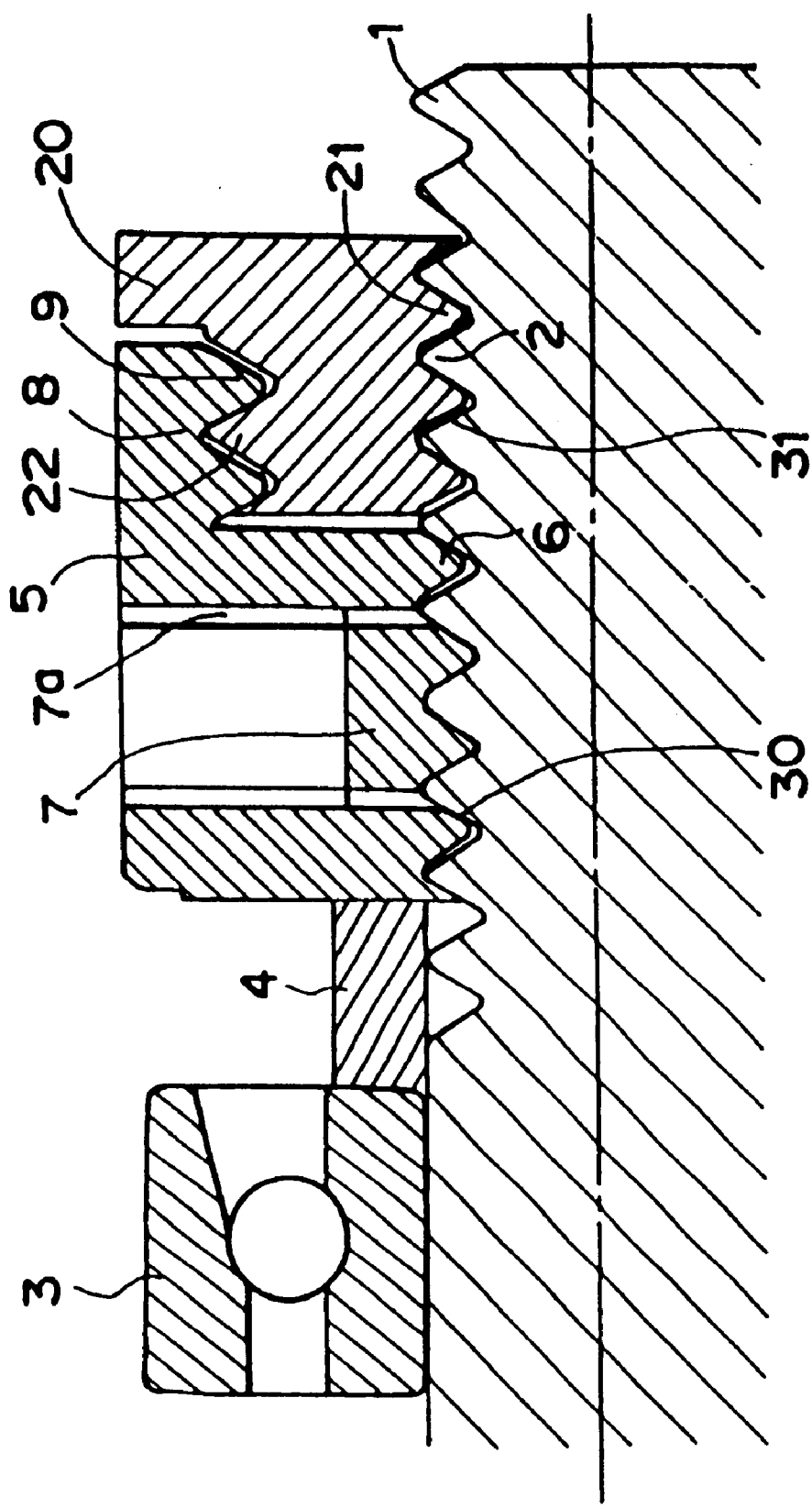
FIG. 1 is a sectional view showing one embodiment of the invention and the state in which a fastening nut is fastened.

Here will be specifically described a structure of a lock nut of the invention with reference to the accompanying drawings. FIG. 1 shows one embodiment of a structure in which a bearing 3 or a member to be fixed is axially thrust by a nut 5 screwed on an externally threaded portion 2 of a rotary shaft 1 and in which the nut 5 is locked.

The externally threaded portion 2 is formed on the axial end side of the rotary shaft 1, and the bearing 3 is fitted on the intermediate portion of the rotary shaft 1 across the externally threaded portion 2. On this bearing 3 on the side of the externally threaded portion 2, there is fitted a cylindrical collar 4 which has an extension to the externally threaded portion 2. The first nut member 5 (as will be called the "fastening nut 5") is so screwed on the externally threaded portion 2 as to come into abutment against that collar 4, so that the bearing 3 and the collar 4 are thrust in the axial direction by that fastening nut 5.

In the inner circumference of the fastening nut 5, on the other hand, there is formed an internally threaded portion 6 to be screwed on the externally threaded portion 2. At three positions in the outer circumference of the fastening nut 5, there are circumferentially equidistantly formed such set threaded portions 7a for set screws 7 as are extended from the outer circumference through the internally threaded portion 6. These set threaded portions 7a of the set screws 7 are individually fastened to correct the deflection of the rotary shaft 1.

At the outer circumferential portion of the end face of the fastening nut 5 on the opposite side of the collar 4, on the other hand, there is formed a cylindrical portion 8 which projects in the axial direction. An internally threaded portion 9 is formed in the inner circumference of the cylindrical portion 8. The internally threaded portion 9 has a lead angle set to a value slightly larger than that of the internally threaded portion 6 which is screwed on the externally threaded portion 2.

On the opposite side of the bearing 3 or the collar 4 across the fastening nut 5, there is screwed in the externally threaded portion 2 a second nut member 20 (as will be called the "lock nut 20"). This lock nut 20 has an internally threaded portion 21 which is screwed in the externally threaded portion 2, and an externally threaded portion 22 which is so formed on the axially opposite side of the internally threaded portion 21 as to be screwed in the internally threaded portion 9 of the fastening nut 5.

Here will be explained the actions of the lock structure thus far described. First of all, the bearing 3 and the collar 4 are sequentially thrust so far around the outer circumference of the rotary shaft 1 that the bearing 3 may come to a not-shown predetermined abutment. On the other hand, the externally threaded portion 22 of the lock nut 20 is screwed to a predetermined length into the internally threaded portion 9 of the fastening nut 5 to connect those nuts 5 and 20. The nuts 5 and 20 thus integrated are then screwed into the externally threaded portion 2 of the rotary shaft 1. In this case, the threaded portions 9 and 22 connecting the nuts 5 and 20 have a lead angle different from that of the externally threaded portion 2 of the rotary shaft 1. Thus, these nuts 5 and 20 are turned together and fed in the axial direction until they come into abutment against the end portion of the collar 4. In this abutting state, the nuts 5 and 20 are further fastened until they are fixed while applying an axial load on the collar 4 and the bearing 3.

Figure 2:
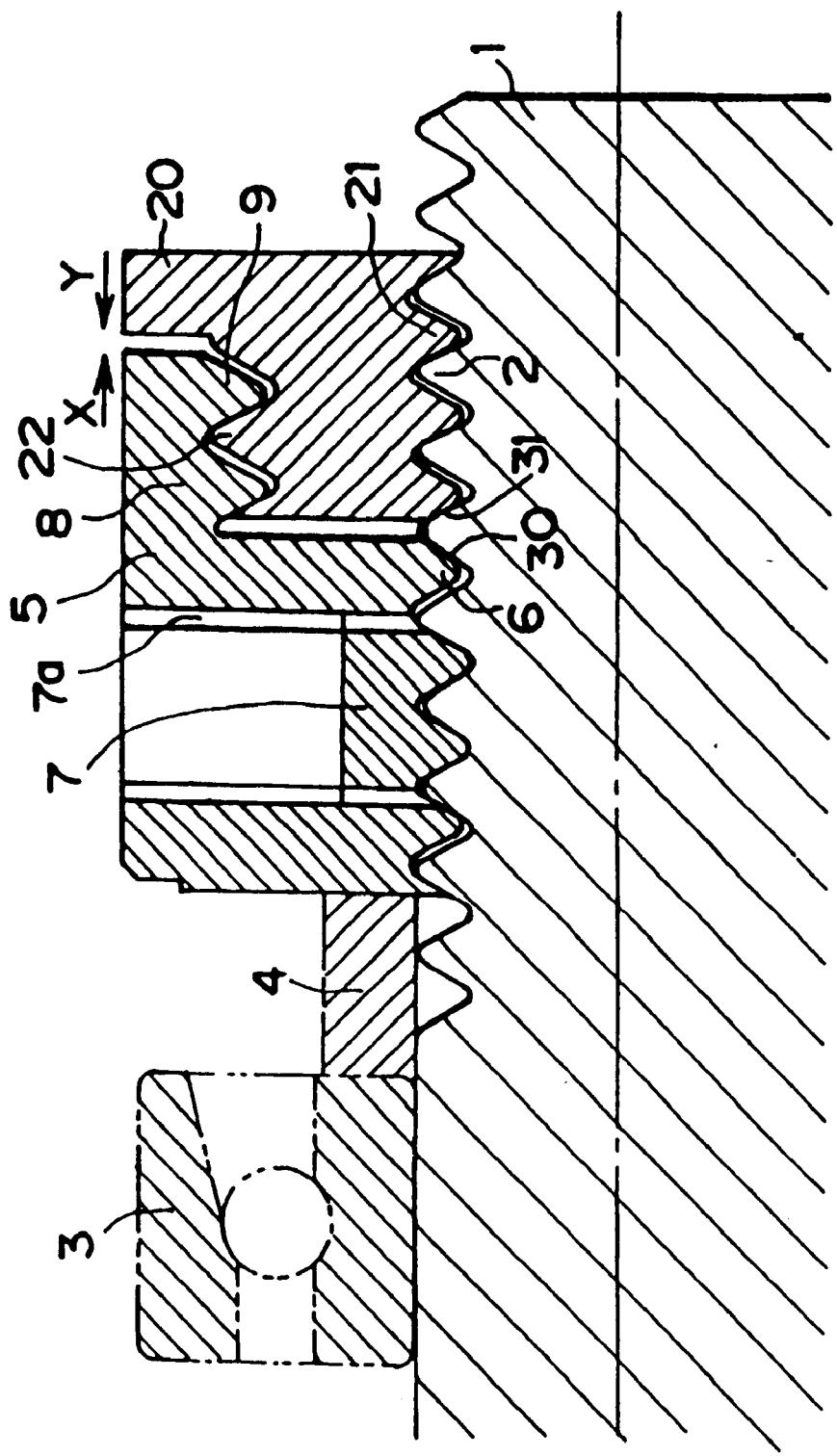
FIG. 2 is a sectional view showing the state in which a lock nut is further fastened from the state of FIG. 1.

Next, the lock nut 20 is turned by itself so that the fastening nut 5 may be locked by the lock nut 20. This locked state is shown in FIG. 2. The lead angle of the internally threaded portion 21 of the lock nut 20 is made slightly smaller than that of the externally threaded portion 22 screwed in the fastening nut 5. When the lock nut 20 is turned by itself, therefore, its axial advance is larger relative to the internally threaded portion 9 of the fastening nut 5 than relative to the externally threaded portion 2 of the rotary shaft 1. In other words, there is established the action of a differential screw to establish a load between the fastening nut 5 and the lock nut 20 in a direction to bring them close to each other.

More specifically, a load indicated by arrow Y in FIG. 2 is applied to the lock nut 20 so that a load indicated by arrow X is applied to the fastening nut 5. By further turning the lock nut 20, therefore, the fastening nut 5 is pulled in the direction of arrow X of FIG. 2 so that the screwed faces 31 between the internally threaded portion 21 of the lock nut 20 and the externally threaded portion 2 of the rotary shaft 1 come into close contact without separating the screwed faces 30 between the internally threaded portion 6 of the fastening nut 5 and the externally threaded portion 2 of the rotary shaft 1. In other words, the fastening nut 5 and the lock nut 20 bring the screwed faces 30 and the screwed faces 31, respectively, into close contact with the externally threaded portion 2 of the rotary shaft 1 to establish a high facial pressure (or frictional force) inbetween thereby to cause a strong locking action. Here, the bearing 3 is fastened through the collar 4 in the axial direction of the rotary shaft 1 by this lock nut structure, as has been described with reference to FIG. 1, so that it is not loosened.

Even after the end of the aforementioned fastening operation, on the other hand, the deflection of the rotary shaft 1 can be corrected by adjusting the fastening forces of the set screws 7, as will be described in the following.

As has been described hereinbefore, the fastening nut 5 is equidistantly equipped with the three sets of threaded portion 7a for the set screws 7, as extended through the internally threaded portion 6. On the other hand, the threaded face of the rotary shaft 1 to be thrust by that set screws 7 takes different inclinations for the different positions of the set screws 7. More specifically, the direction and magnitude of the load along the screwed faces of the rotary shaft 1 are different for the different positions of the set screws 7 so that a bending load is applied to the rotary shaft 1 to establish the deflection. Therefore, the set screws 7, as screwed in the set threaded portions 7a at the three positions, are individually fastened to establish different bending loads upon the rotary shaft 1. As a result, the deflection of the rotary shaft 1, if caused by fastening any of the set screws 7, can be corrected by fastening another or others.

According to the lock nut structure thus far described, therefore, the axial load can be applied to lock the fastening nut 5 by fastening the lock nut 20 solely, and the deflection of the rotary shaft 1 can also be corrected by fastening the set screws 7 individually. As a result, the locking action of the fastening nut 5 and the correction of the deflection of the rotary shaft 1 are made independently of each other, that is, one action exerts no influence upon the other, so that these actions can be performed with ease and for a short time. Here in the foregoing embodiment, the set threaded portions 7a and the set screws 7 are provided at the three positions, but this number should not be limited to three but may be a necessary one.

Here will be described another embodiment of the invention. In this embodiment, the portions substantially identical to those of the foregoing embodiment will be designated by the common reference numerals, and their description will be omitted. In the embodiment shown in FIG. 3, the thread structure for connecting the fastening nut 5 and the lock nut 20 is reversed from that of the foregoing embodiment. With the portion of the fastening nut 5 on the opposite side of the collar 4, more specifically, there is integrally formed a cylindrical shaft portion 8a which has an externally threaded portion 9a formed on the outer circumference. On the other hand, the lock nut 20 has a cylindrical portion 20a which is projected toward the fastening nut 5. In the inner circumference of the cylindrical portion 20a, there is formed an internally threaded portion 22a which is to be screwed on the externally threaded portion 9a of the fastening nut 5. Moreover, these externally threaded portion 9a and internally threaded portion 22a have a lead angle set slightly larger than that of the externally threaded portion 2 of the rotary shaft 1.

Figure 3:
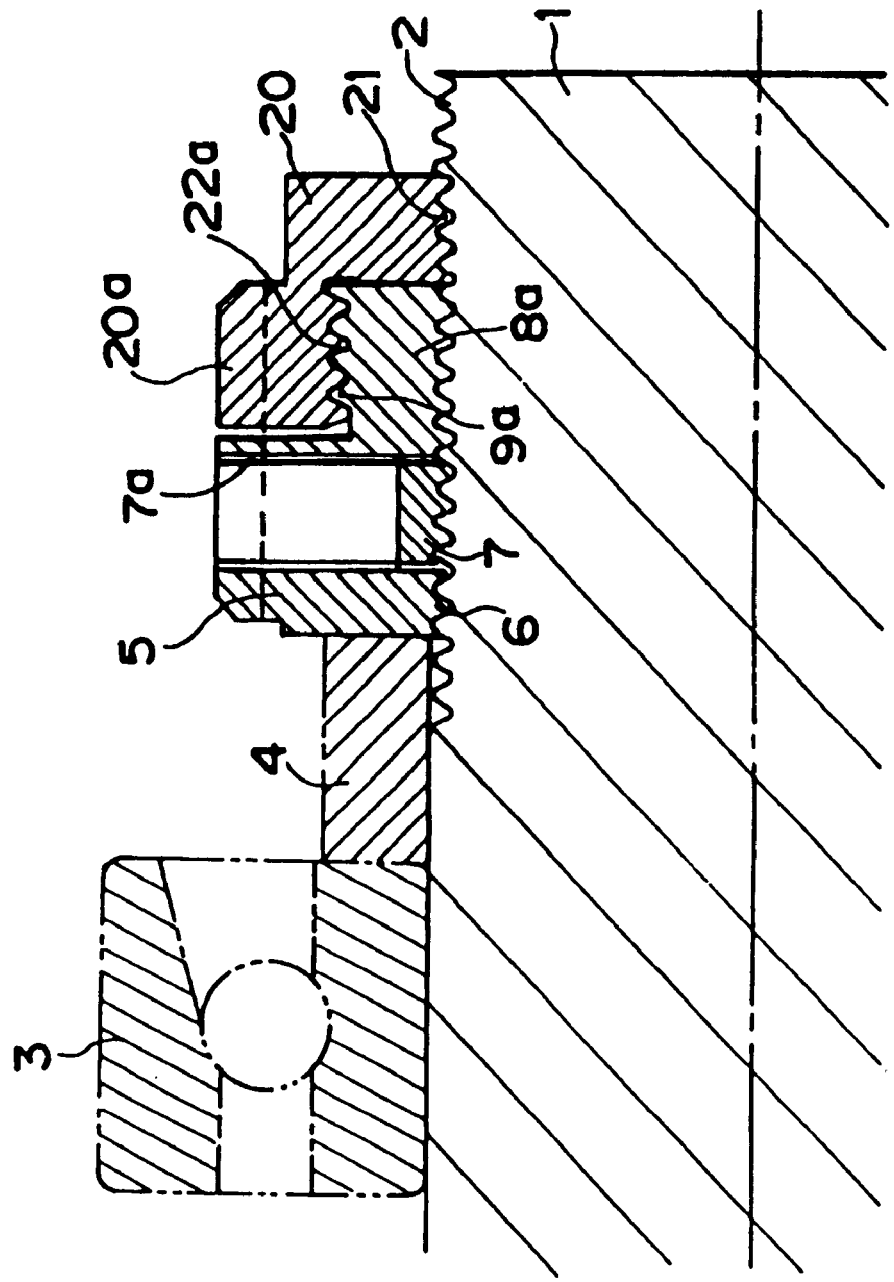
FIG. 3 is a sectional view showing another specific embodiment of the invention.

With the construction shown in FIG. 3, therefore, the individual nuts 5 and 20 are so screwed by the fastening nut 5 as to thrust the collar 4 and the bearing 3 in the axial direction, and the lock nut 20 is further fastened. Then, by the differential screw action due to the aforementioned difference in the lead angles, the axial force is established in such a direction between the individual nuts 5 and 20 as to bring them close to each other so that the fastening nut 5 is, so to speak, locked. Even in this case, it is possible to correct the deflection of the rotary shaft 1 before or after the locking operation.

Figure 4:
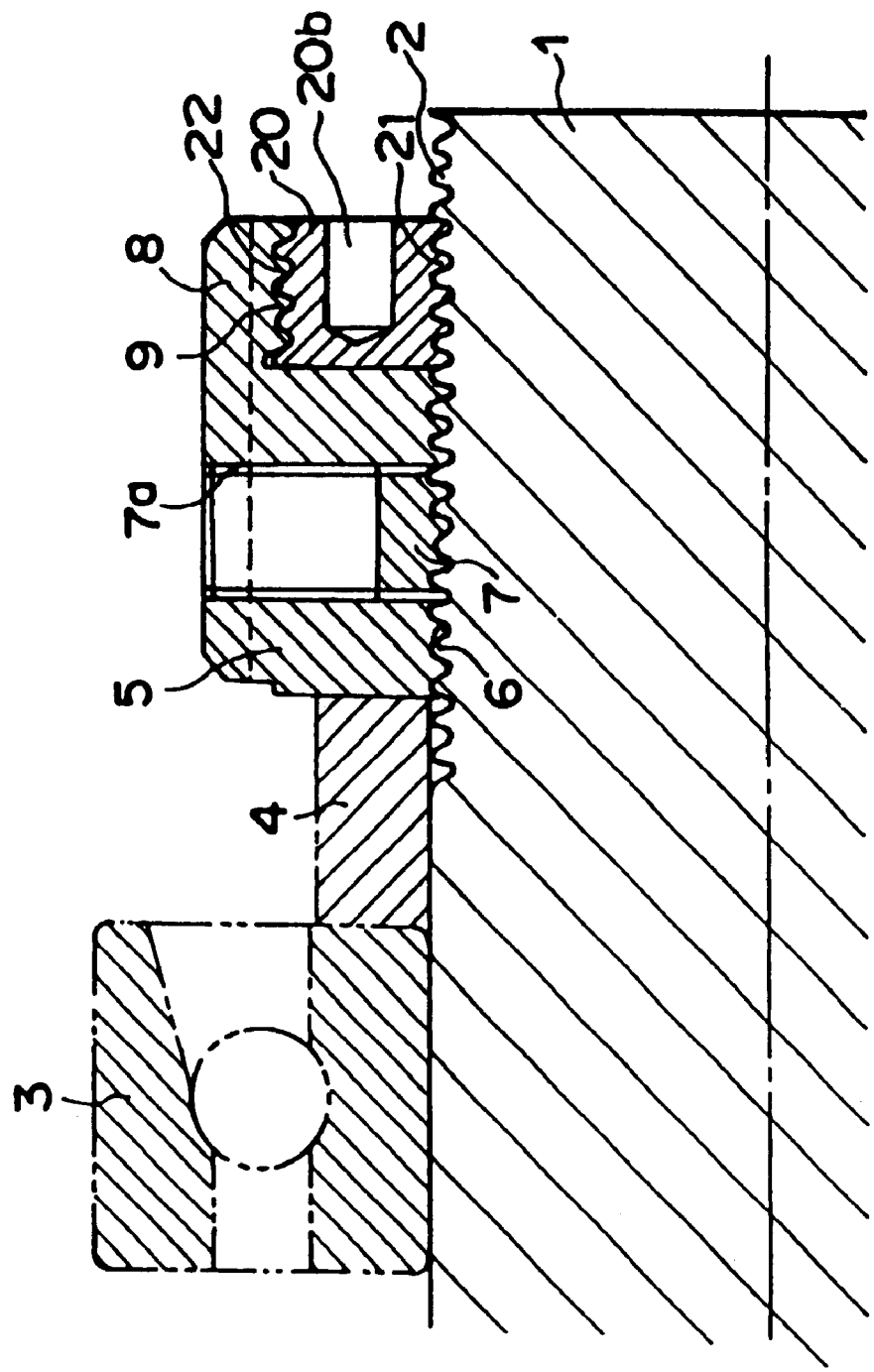
FIG. 4 is a sectional view showing still another specific embodiment of the invention.

FIG. 4 shows still another embodiment, in which the shape of the lock nut 20 shown in FIGS. 1 and 2 is modified. As shown in FIG. 4, more specifically, the lock nut 20 is formed into a ring shape omitting the portion corresponding to the flanged portion and has the threaded portions 21 and 22 formed all over its inner and outer circumferences. Accordingly, the lock nut 20 has a tool hole 20b formed in its end face for retaining a (not-shown) tool to turn the lock nut 20. The remaining construction is similar to that shown in FIGS. 1 and 2. Specifically, the threaded portion 22 on the outer circumference has a lead angle larger than that of the threaded portion 21 in the inner circumference. With the construction shown in FIG. 4, therefore, the locking action of the fastening nut 5 and the correction of the deflection of the rotary shaft 1 can also be performed as the different operations with ease and for a short time, as in the foregoing individual embodiments.

Figure 5:
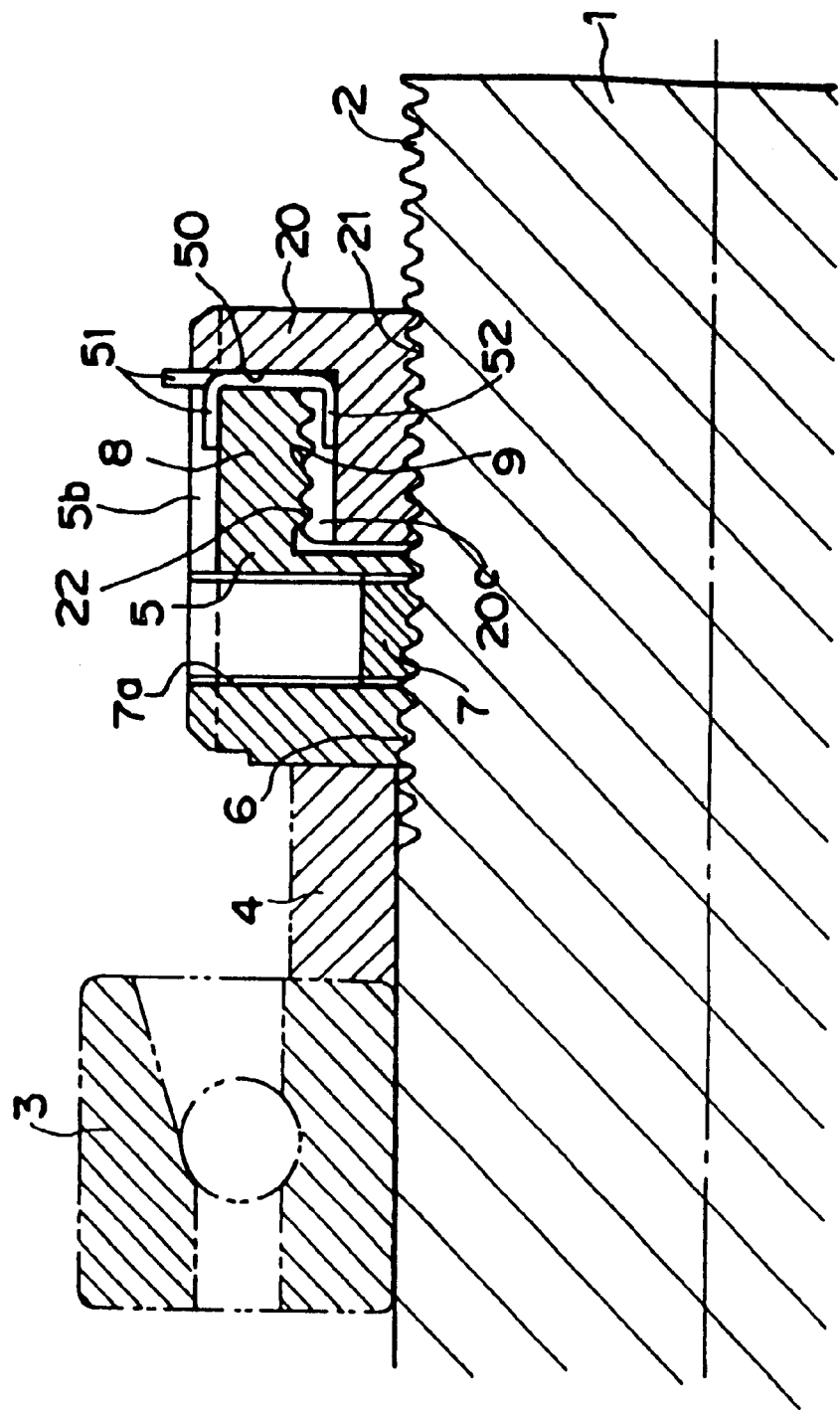
FIG. 5 is a sectional view showing an embodiment using a washer.

Here will be described an embodiment which employs a washer for enhancing the aforementioned locking effect of the lock structure. FIG. 5 is a sectional view showing the case in which the washer is applied to the lock structure. Here, the description of the same members or portions as those of the foregoing individual embodiments will be omitted by designating them by the common reference numerals in FIG. 5.

Figure 6:
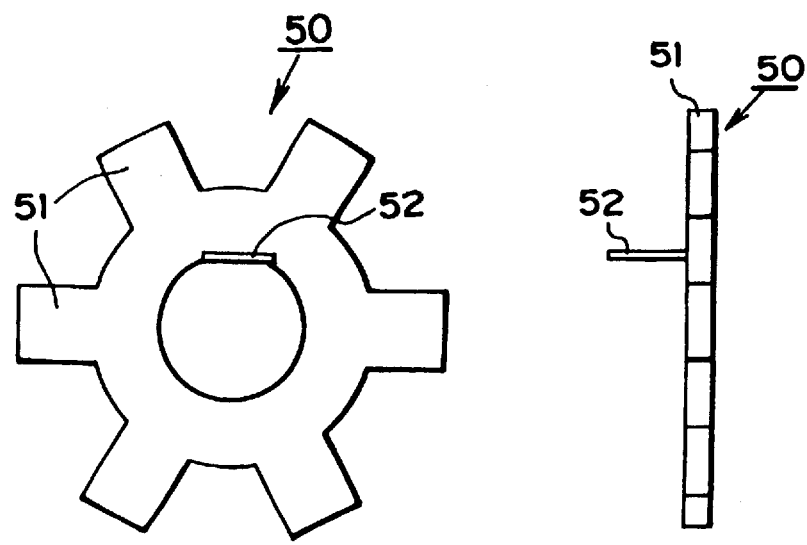
FIG. 6 presents a front elevation and a side elevation showing a shape of the washer.
Figure 7:
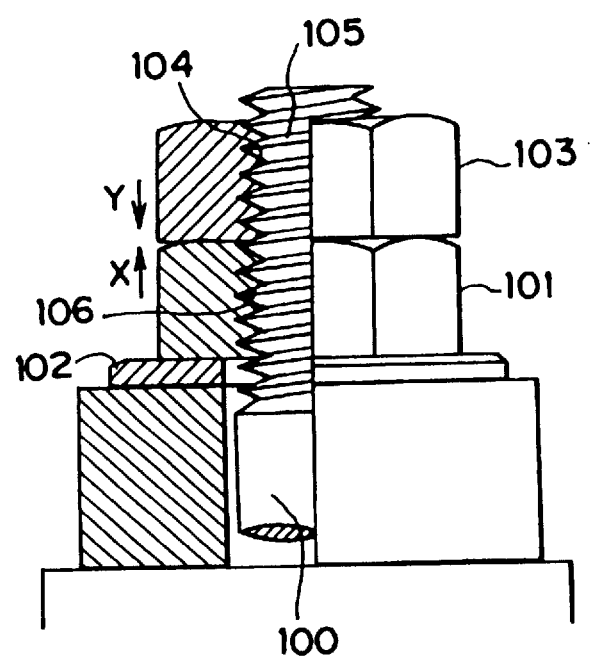
FIG. 7 is a partially sectional view showing the fastened state of a lock nut of the prior art.
Figure 8:
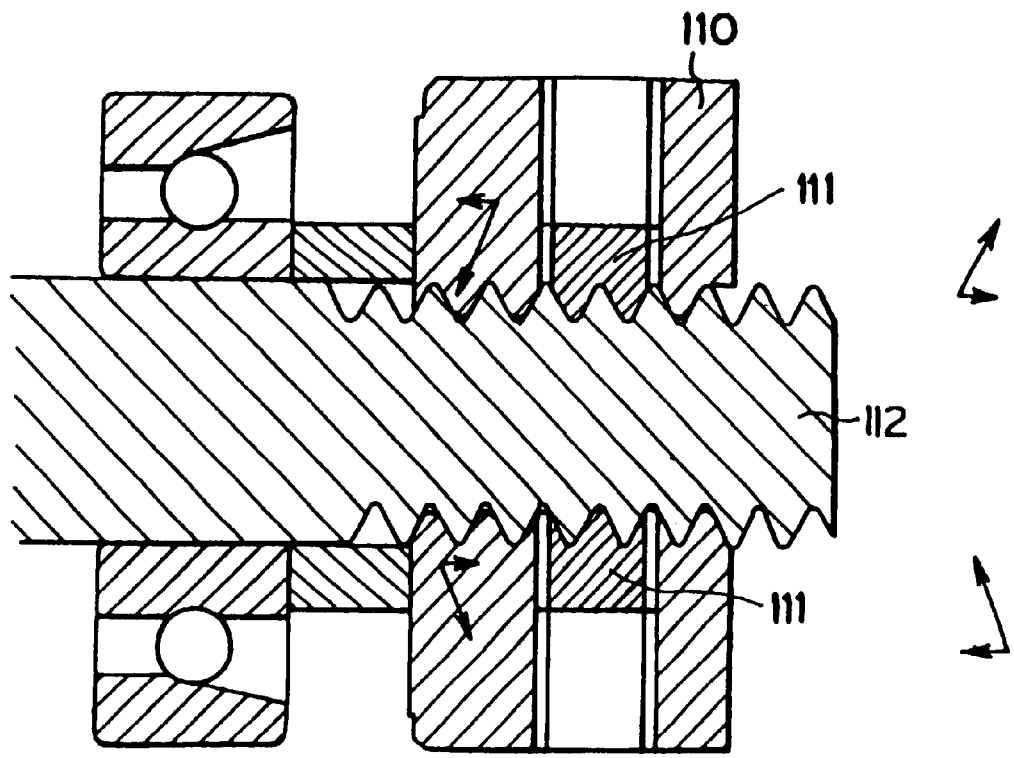
FIG. 8 is a sectional view showing a precision lock nut of the prior art.

The washer, as designated by 50, of this specific embodiment is shown in FIG. 6 and is so interposed between the fastening nut 5 and the lock nut 20 that it may integrate the two nuts 5 and 20 in the turning direction. Specifically, the washer 50 is generally formed into a ring shape which is provided its outer circumference with six axially foldable pawl portions 51 and on its inner circumference with a pawl portion 52 protruding in the axial direction.

On the other hand, the fastening nut 5 is provided at a portion of the outer circumference of the cylindrical portion 8 with a notched portion 5b for fitting therein one of the outer circumferential pawl portions 51 of the washer 50. Moreover, the lock nut 20 is provided at a portion of the root end portion of the externally threaded portion 22 with a notched portion 20c for fitting therein the inner circumferential pawl portion 52 of the washer 50.

Thus, the washer 50 is inserted into the clearance between the fastening nut 5 and the lock nut 20 to bring the inner circumferential pawl portion 52 into engagement with the notched portion 20c of the lock nut 20. In order to lock the fastening nut 5, moreover, the lock nut 20 is turned with respect to the fastening nut 5, and any of the outer circumferential pawl portions 51 of the washer 50 is then folded into engagement of the corresponding notched portion 5b of the fastening nut 5. As a result, the washer 50 is integrated with the lock nut 20 in the turning direction by its inner circumferential pawl portion 52 and with the fastening nut 5 in the turning direction by the outer circumferential pawl portion 51 so that the individual nuts 5 and 20 are integrated with each other in the turning direction through the washer 50. In short, these nuts 5 and 20 are locked.

Here, the specific embodiments thus far described are exemplified by setting the lead angle of the threaded portion for connecting the fastening nut and the lock nut larger than that of the threaded portion of the rotary shaft. In short, however, it is sufficient that those threaded portions have different lead angles, and the invention should not be limited to those specific embodiments. In addition, the member to be fixed in the invention should not be limited to the bearing, as employed in those embodiments.

According to the invention, as has been described hereinbefore, when the second nut member is turned relative to the first nut member with the individual nut members being screwed on the externally threaded portion of the rotary shaft, the differential screw action is established because of the difference between the portion screwed on the externally threaded portion of the rotary shaft and the portion screwed on the first nut member. As a result, the axial force is established between the two nut members. This axial force raises the facial pressure on the externally threaded portion of the rotary shaft so that the locking force of the nut member can rise to ensure the so-called "locking action". In this case, the load acts in the axial direction to exert little influence upon the deflection of the rotary shaft. Thus, the locking action of the nut and the correction of the deflection of the rotary shaft can be made the functions independent of each other. As a result, it is possible to improve the workabilities of the locking action of the member to be fixed on the rotary shaft and the nut member for fixing the member and the correction of the deflection of the rotary shaft, thereby to perform the works with ease and for a short time.

What is claimed is:

1. A lock structure, in which a nut member is screwed on an externally threaded portion formed on an outer circumference of a shaft member in the axial direction and in which a fixed member fitted on said shaft member is thrust in the axial direction and fixed by said nut member, comprising:

a lock nut member screwed in said threaded portion on the opposite side of said fixed member across said nut member;

a first threaded portion formed in a portion of said nut member other than the portion screwed on said threaded portion and having a lead angle different from a lead angle of said threaded portion;

a second threaded portion screwed in said first threaded portion and formed on said lock nut member;

hole-shaped set threaded portions extending from an outer circumference to an inner circumference of said nut member; and set screws screwed in the hole-shaped set threaded portions and abutting against said externally threaded portions.

2. A lock structure according to claim 1, further comprising:

a cylindrical portion having said first threaded portion formed in its inner circumference and made integral with said nut member, wherein said second threaded portion is formed on the outer circumference of said lock nut member.

3. A lock structure according to claim 2, further comprising:

a tool hole formed in one axial end face of said lock nut member and directed in the axial direction for engaging with a tool.

4. A lock structure according to claim 1, further comprising:

a cylindrical shaft portion having said first threaded portion formed on its outer circumference and made integral with said nut member; and a cylindrical portion, in which said second threaded portion to be screwed on said first threaded portion is formed in its inner circumference, and which is made integral with said lock nut member.

5. A lock structure according to claim 1, wherein said shaft member includes a rotary shaft, and wherein said fixed member includes a bearing fitted on an outer circumference of said rotary shaft.

6. A lock structure according to claim 5, further comprising:

a cylindrical collar interposed between said bearing and said nut member.

7. A lock structure according to claim 1, further comprising:

a washer member for connecting said nut member and said lock nut member in a turning direction.

8. A lock structure according to claim 7, wherein said washer member includes: a sheet portion sandwiched between said nut member and said lock nut member; a first pawl portion projecting in the axial direction from said sheet portion for engaging with said nut member; and a second pawl portion projecting in the axial direction from said sheet portion for engaging with said lock nut member.

* * * * *